(12) United States Patent
Bando et al.

(10) Patent No.: US 11,942,873 B2
(45) Date of Patent: Mar. 26, 2024

(54) SECONDARY MAGNETIC EXCITATION GENERATOR-MOTOR DEVICE

(71) Applicants: HITACHI MITSUBISHI HYDRO CORPORATION, Tokyo (JP); HITACHI, LTD., Tokyo (JP)

(72) Inventors: Akira Bando, Tokyo (JP); Hironari Kawazoe, Tokyo (JP); Akira Kikuchi, Tokyo (JP)

(73) Assignees: HITACHI MITSUBISHI HYDRO CORPORATION, Tokyo (JP); HITACHI, LTD., Tokyo (JP)

( * ) Notice: Subject to any disclaimer, the term of this patent is extended or adjusted under 35 U.S.C. 154(b) by 309 days.

(21) Appl. No.: 17/611,100

(22) PCT Filed: Aug. 8, 2019

(86) PCT No.: PCT/JP2019/031524
§ 371 (c)(1),
(2) Date: Nov. 12, 2021

(87) PCT Pub. No.: WO2020/230343
PCT Pub. Date: Nov. 19, 2020

(65) Prior Publication Data
US 2022/0231615 A1    Jul. 21, 2022

(30) Foreign Application Priority Data

May 16, 2019   (JP) ................................ 2019-093149

(51) Int. Cl.
*H02M 7/487* (2007.01)
*H02K 21/04* (2006.01)
(Continued)

(52) U.S. Cl.
CPC ............ *H02M 7/487* (2013.01); *H02K 21/04* (2013.01); *H02M 7/5395* (2013.01); *H02P 9/007* (2013.01); *H02P 9/38* (2013.01); *H02P 27/14* (2013.01)

(58) Field of Classification Search
CPC ..... H02M 7/487; H02M 7/5395; H02P 9/007; H02P 9/38; H02P 27/14
See application file for complete search history.

(56) References Cited

U.S. PATENT DOCUMENTS 3,909,698 A * 9/1975 Nill ........................ H02M 7/162
                                                       363/128
10,630,164 B1 * 4/2020 Bax ........................ H02M 5/458
(Continued)

FOREIGN PATENT DOCUMENTS

JP         3222028 B2   10/2001
JP         5401213 B2    1/2014
(Continued)

OTHER PUBLICATIONS

Eizo Kita, et al., "400-MW Adjustable-Speed Pumped-Storage Hydraulic Power Plant," Hitachi Review, vol. 44, No. 1, 1995, 9 pages.

(Continued)

*Primary Examiner* — Pedro J Cuevas
(74) *Attorney, Agent, or Firm* — Rimon P.C.

(57) ABSTRACT

A secondary magnetic excitation generator-motor device that inputs a first ignition pulse command to a three-level NPC power converter such that a detected excitation current value corresponds with an excitation current command value, the secondary magnetic excitation generator-motor device having a function of identifying a first phase, a second phase, or a third phase in descending order of a current absolute value, wherein a pulse switch to output an ignition pulse command to the three-level NPC power converter switches the ignition pulse command to the second ignition pulse command when a current absolute value exceeds a set overcurrent level 1, and switches the ignition pulse command to the first ignition pulse command when current absolute values for three phases are all equal to or smaller than a set overcurrent level 2.

12 Claims, 9 Drawing Sheets

(51) Int. Cl.
*H02M 7/5395* (2006.01)
*H02P 9/00* (2006.01)
*H02P 9/38* (2006.01)
*H02P 27/14* (2006.01)

(56) References Cited

U.S. PATENT DOCUMENTS

| | | | |
|---|---|---|---|
| 11,218,086 B2* | 1/2022 | Liu | H02P 6/08 |
| 2006/0087250 A1* | 4/2006 | Fiorello | H05B 41/2886 |
| | | | 315/212 |
| 2006/0087259 A1* | 4/2006 | Fiorello | H05B 41/2882 |
| | | | 315/291 |
| 2013/0241463 A1 | 9/2013 | Bando et al. | |
| 2014/0111066 A1 | 4/2014 | Ito et al. | |
| 2015/0002106 A1 | 1/2015 | Inagaki et al. | |
| 2018/0109201 A1 | 4/2018 | Li et al. | |

FOREIGN PATENT DOCUMENTS

| | | |
|---|---|---|
| JP | 2014-87141 A | 5/2014 |
| JP | 2015-12693 A | 1/2015 |
| WO | 2015/186232 A1 | 12/2015 |

OTHER PUBLICATIONS

International Search Report issued in corresponding International Patent Application No. PCT/JP2019/031524, dated Nov. 5, 2019, with English translation.
Extended European Search issued in corresponding European Patent Application No. 19929015.6, dated Jan. 2, 2023.

* cited by examiner

| CUR-RENT | MODE | 1 | 2 | 3 | 4 | 5 | 6 | 7 | 8 | 9 | 10 | 11 | 12 |
|---|---|---|---|---|---|---|---|---|---|---|---|---|---|
| IU | MAGNITUDE ORDER | SECOND | FIRST | FIRST | SECOND | THIRD | THIRD | SECOND | FIRST | FIRST | SECOND | THIRD | THIRD |
| IU | SIGN | >0 | >0 | >0 | >0 | >0 | <0 | <0 | <0 | <0 | <0 | <0 | >0 |
| IV | MAGNITUDE ORDER | FIRST | SECOND | THIRD | THIRD | SECOND | FIRST | FIRST | SECOND | THIRD | THIRD | SECOND | FIRST |
| IV | SIGN | <0 | <0 | <0 | >0 | >0 | >0 | >0 | >0 | >0 | <0 | <0 | <0 |
| IW | MAGNITUDE ORDER | THIRD | THIRD | SECOND | FIRST | FIRST | SECOND | THIRD | THIRD | SECOND | FIRST | FIRST | SECOND |
| IW | SIGN | >0 | <0 | <0 | <0 | <0 | <0 | <0 | >0 | >0 | >0 | >0 | >0 |

SECONDARY MAGNETIC EXCITATION GENERATOR-MOTOR DEVICE

CROSS-REFERENCE OF RELATED APPLICATIONS

This application is the U.S. National Phase under 35 U.S.C. § 371 of International Patent Application No. PCT/JP2019/031524, filed on Aug. 8, 2019, which in turn claims the benefit of Japanese Application No. 2019-093149, filed on May 16, 2019, the entire disclosures of which Applications are incorporated by reference herein.

FIELD

The present invention relates to a secondary magnetic excitation generator-motor device using a secondary magnetic excitation power converter.

BACKGROUND

An AC magnetic excitation generator motor using a secondary magnetic excitation power converter can control an output of reactive power in the same manner as a conventional fixed-speed synchronous machine, and additionally can achieve high-speed torque control or high-speed active power control within a rotational speed range around the synchronous speed. Due to this control, the AC magnetic excitation generator motor has an advantage of optimally operating a prime mover, such as a pump turbine system or a wind power system, under wider operational conditions as compared to a conventional fixed-speed generator motor. Further, the AC magnetic excitation generator motor has also an advantage of contributing to frequency stabilization in the power system by temporarily releasing and absorbing energy of a flywheel that is a rotational part to and from the power system.

In contrast, the secondary magnetic excitation power converter can reduce the capacity relative to the armature capacity of a generator; however, the secondary magnetic excitation power converter has not only a much larger capacity, but also a more complex circuit as compared to a magnetic excitation power converter of the conventional fixed-speed synchronous machine. Thus, it is economically difficult to ensure an overcurrent withstand capability and an excitation ceiling voltage equal to those of the magnetic excitation power converter of the conventional fixed-speed synchronous machine.

In view of the above circumstances, a method has been employed in general to operate a short circuit for an excitation winding overcurrent when an anomaly has occurred in the AC system to bypass the magnetic excitation power converter in order to reduce the overcurrent capacity. In particular, when an excitation winding is short-circuited, torque of the generator motor is suddenly varied to torque of a winding induction machine when the secondary resistance is short-circuited. In addition, the torque of the generator motor is varied significantly depending on the rotational speed before the excitation winding is short-circuited. This results in the drawback of greatly affecting the power system and causing instability of the power system, although the generator-motor device can run continuously. When the secondary resistance is short-circuited, reactive power is consumed, which further decreases the voltage in the AC system. This results in the drawback of inhibiting power supply to consumers.

In order to deal with this drawback, Non Patent Literature 1 discloses a method for a separately-excited secondary magnetic excitation power converter to which a thyristor converter is connected in inverse parallel, where the thyristor converter does not have a self-arc-extinguishing function. In this method, when the separately-excited secondary magnetic excitation power converter detects an excitation overvoltage, a power converter with reverse polarity to an excitation current command is ignited to continuously run. For another example, there is disclosed a 400 MW-class secondary magnetic excitation generator-motor device that computes a loss generated on the basis of a current value of a power semiconductor, and regularly computes an element junction temperature on the basis of a coolant temperature to allow for a time limit to overcurrent protection. Due to this configuration, the 400 MW-class secondary magnetic excitation generator-motor device has realized continued operation without interrupting an excitation control even during more than 250 times of system ground faults for a quarter of a century during which no short-circuit operation is performed at all.

Meanwhile, the technologies of self-arc-extinguishing semiconductor power elements have advanced remarkably in recent years. Development of larger-capacity and higher-voltage self-excited power converters has progressed, in which an IGBT (Insulated Gate Bipolar Transistor), an IGCT (Integrated Gate Commutated Thyristor), or other semiconductor elements are used. The self-excited power converters have advantages of having a function of regulating the converter power factor over separately-excited converters. In contrast, in a case where a secondary magnetic excitation generator-motor device is required to continuously run and continuously supply reactive power even when an anomaly has occurred in the power system, there is a problem that it is economically difficult for a converter using a self-arc-extinguishing semiconductor element to ensure a short-time overcurrent withstand capability. The reason for this is that the self-arc-extinguishing element has its current element rating that is determined by a momentary current interruption withstand capability, in contrast to the conventional element, such as a thyristor, that can have an overcurrent withstand capability in the order of 100 milliseconds to seconds up to the upper limit of the junction temperature in accordance with the heat capacity of the element itself.

In order to deal with this drawback, there is a method available, which focuses attention on the fact that a diode connected in inverse parallel to the self-arc-extinguishing element is a bipolar element having an overcurrent withstand capability like a thyristor.

There is the simplest method in which the gates to all the self-arc-extinguishing elements are switched off to perform a diode-bridge operation. According to this method, there is a problem that the degree of freedom of current flowing in an excitation circuit, which is normally "2", is decreased to "1", and it is thus difficult to return the degree of freedom of current to "2" rapidly in a stable manner, and to resume normal control.

In Patent Literature 1, a secondary magnetic excitation generator transmission device provided with operational continuity performance and stability as high as those of a separately-excited secondary magnetic excitation power converter is realized by employing a control mode that is bidirectionally switchable to/from normal PWM control without operating the short circuit or without switching the gate off even when an overcurrent is generated at the occurrence of an accident in the system, that is, while maintaining the degree of freedom of current flowing in the excitation circuit at "2". By employing this control mode, the secondary magnetic excitation generator transmission device allows all the excitation current to pass through the diode during the period during which an overcurrent is generated, and returns the control to the normal PWM control after the resumption from the overcurrent.

CITATION LIST

Patent Literatures

Patent Literature 1: Japanese Patent No. 5401213
Patent Literature 2: Japanese Patent No. 3222028

Non Patent Literature

Non Patent Literature 1: HITACHI REVIEW 1995 Vol. 44

SUMMARY

Technical Problem

The method in Patent Literature 1 is disclosed as a method to realize a self-excited secondary magnetic excitation power converter using a self-arc-extinguishing element.

In a case where the capacity of the secondary magnetic excitation power converter is increased in proportion to the increase in the capacity of the generator motor, the AC output voltage is required to increase to a relatively high level. However, when the secondary magnetic excitation power converter is a two-level converter, an AC-side output phase voltage relative to a DC capacitor voltage Vc is limited to two levels, (+Vc/2) and (−Vc/2). Therefore, an increase in the voltage of the secondary magnetic excitation power converter to a relatively high level is only achieved by increasing the DC capacitor voltage Vc.

However, as the DC capacitor voltage Vc is increased, the AC-side output phase voltage is also increased, and consequently a time rate of change dV/dt in the voltage to be applied to a rotor-side excitation winding coil is also increased. In the insulation specifications of coils, a rated AC voltage and a peak voltage value are defined in general. However, it is known that degradation of the coil insulation over time due to a dielectric loss rapidly progresses when the time rate of change in the voltage exceeds a predetermined value. Even though this predetermined value is assumed to be the same, when the polarity changes without a voltage-zero period as shown by an output from the two-level converter, it is assumed that "degradation of coil insulation over time is more likely to further progress as compared to the case where the voltage changes through the voltage-zero period". Further, it is pointed out that as compared to a coil applied with varnish in a vacuum in an integrally assembled state in a factory, the allowable value of the time rate of change in the voltage, which is restricted due to the degradation of coil insulation over time, is substantially decreased in a case when a coil is assembled on site.

In view of the above circumstances, there is a problem that it is difficult to continuously use a two-level converter not only as a secondary magnetic excitation power converter to be used for a variable-speed pumped storage power plant, but also as a secondary magnetic excitation power converter for an offshore wind turbine with a higher capacity.

As a solution to the above problems, there is a possible method using a three-level NPC power converter. In a three-level converter, an AC output phase voltage relative to the voltage Vc of two DC capacitors connected in series has three levels, (+Vc), (0), and (−Vc). The three-level converter has an effect of ensuring an AC output voltage that is twice as high as that in the two-level converter even though the capacitor DC voltage Vc is equal between the three-level converter and the two-level converter. Consequently, the three-level converter has an effect of decreasing the time rate of change dV/dt in the voltage to be applied to the coil. Since the three-level converter has a voltage-zero period, there is also an effect of alleviating degradation of coil insulation over time due to dielectric loss even though the time rate of change dV/dt in the voltage to be applied to the coil is equal to that of the two-level converter.

However, the method in Patent Literature 1 is only applicable to two-level system power converters.

An object of the present invention is to provide a secondary magnetic excitation generator-motor device that employs a three-level NPC power converter, that ensures operational continuity at the occurrence of an accident in a system, and that contributes to system stabilization.

Solution to Problem

A three-level NPC power converter connected to a rotor-side excitation winding has a three-phase three-line circuit with the degree of freedom of current "2" similarly to the two-level converter disclosed in Patent Literature 1. Due to this configuration, unless a bypass circuit is operated, or gates of all elements are switched off, the magnitude relation between absolute values of three-phase currents IU, IV, and IW, and the signs of the three-phase currents IU, IV, and IW can be limited to 12 modes illustrated in FIG. 9 not only during normal operation, but also when an overcurrent is generated at the occurrence of an accident in the system.

Figure 9:
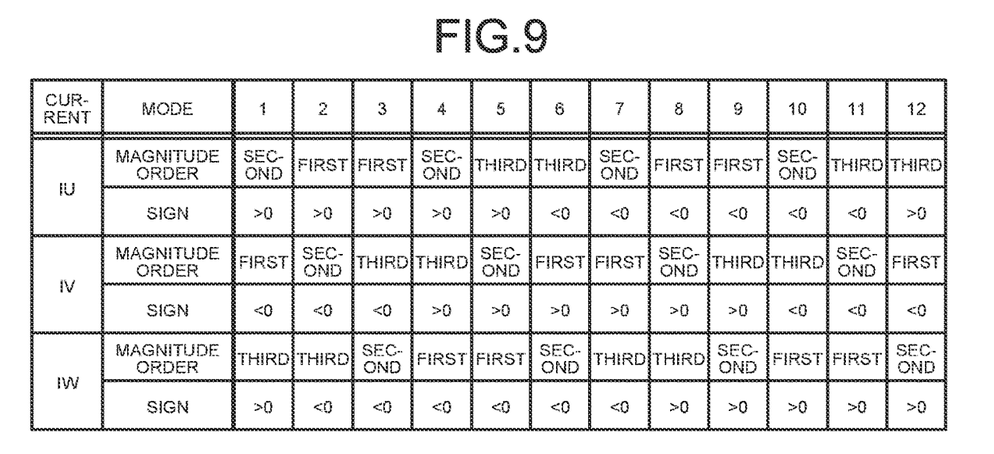
FIG. 9 is a diagram illustrating a conduction mode classification of the three-level NPC power converter.
Figure 10:
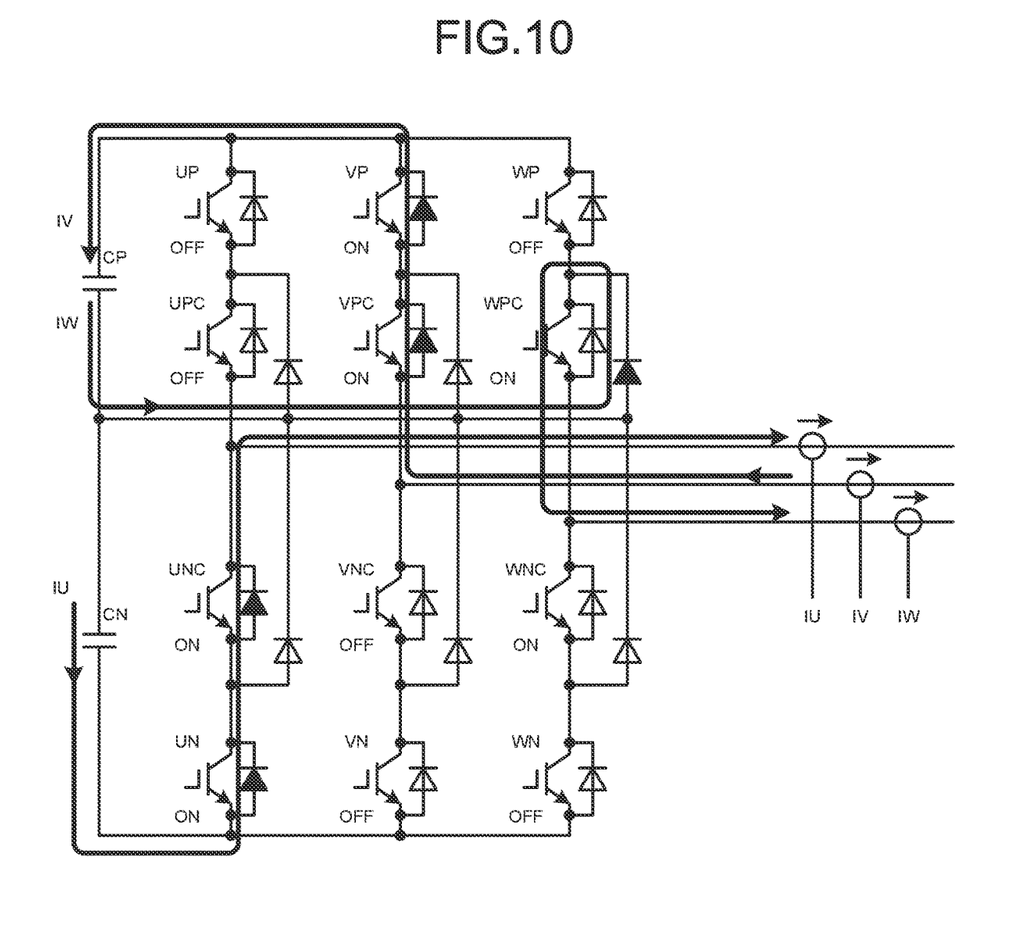
FIG. 10 is a diagram illustrating a W-phase positive-side clamp circuit of the three-level NPC power converter at the time of conduction.

FIG. 10 illustrates a solution to the problems in the mode 1 in FIG. 9 by describing the operation of the three-level NPC power converter.

When an absolute value of the V-phase current IV is largest, and the polarity of the V-phase current IV is negative, the gates of an element VPC and an element VP are fixed to the on-side, while the gates of an element VN and an element VNC are fixed to the off-side. Due to this operation, the current IV flows from a power converter V-phase into a positive-side DC capacitor CP to charge the positive-side DC capacitor CP with the current IV.

When an absolute value of the U-phase current IU is the second largest value, and the polarity of the U-phase current IU is positive, the gates of an element UNC and an element UN are fixed to the on-side, while the gates of an element UP and an element UPC are fixed to the off-side. Due to this operation, the current IU flows out from a power converter U-phase into a negative-side DC capacitor CN to charge the negative-side DC capacitor CN with the current IU.

Since an absolute value of the remaining W-phase current IW is the third largest value (smallest), the gates of an element WPC and an element WNC are fixed to the on-side, while the gates of an element WP and an element WN are fixed to the off-side regardless of the current polarity. Due to this operation, the current IW flowing out from the power converter W-phase is supplied from the positive-side DC capacitor via the neutral point, and a positive-side clamp diode.

As a result of this, in the mode 1, the absolute value of the current IV that charges the positive-side DC capacitor is larger than the absolute value of the current IU that charges the negative-side DC capacitor. Accordingly, the positive-side DC capacitor voltage is higher than the negative-side DC capacitor voltage, which becomes a factor of causing voltage imbalance.

Figure 11:
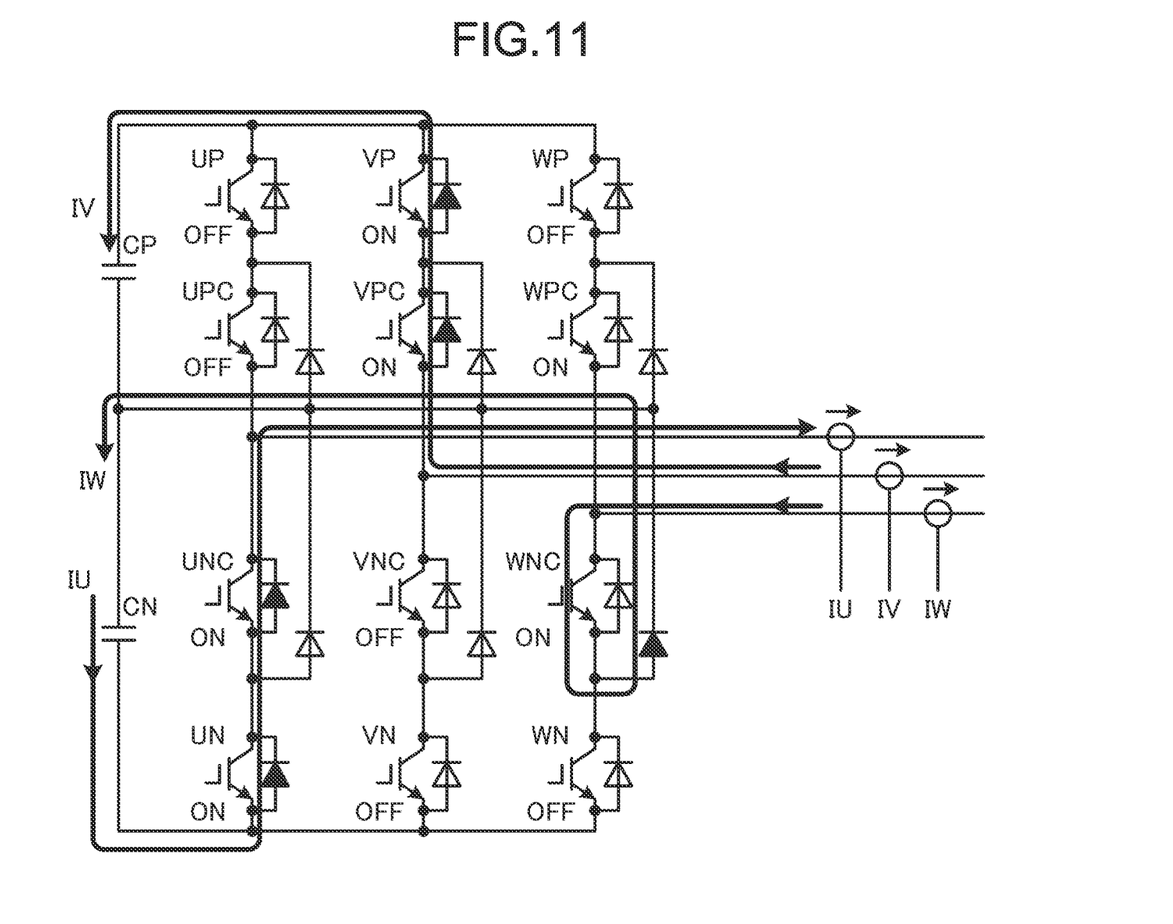
FIG. 11 is a diagram illustrating a W-phase negative-side clamp circuit of the three-level NPC power converter at the time of conduction.

FIG. 11 illustrates a solution to the problems in the mode 2 in FIG. 9 by describing the operation of the three-level NPC power converter.

When an absolute value of the U-phase current IU is the largest, and the polarity of the U-phase current IU is positive, the gates of the element UNC and the element UN are fixed to the on-side, while the gates of the element UP and the element UPC are fixed to the off-side. Due to this operation, the current IU flows out from the power converter U-phase into the negative-side DC capacitor CN to charge the negative-side DC capacitor CN with the current IU.

When an absolute value of the V-phase current IV is the second largest value, and the polarity of the V-phase current IV is negative, the gates of the element VPC and the element VP are fixed to the on-side, while the gates of the element VN and the element VNC are fixed to the off-side. Due to this operation, the current IV flows from the power converter V-phase into the positive-side DC capacitor CP to charge the positive-side DC capacitor CP with the current IV.

Since an absolute value of the remaining W-phase current IW is the third largest value (smallest), the gates of the element WPC and the element WNC are fixed to the on-side, while the gates of the element WP and the element WN are fixed to the off-side regardless of the current polarity. Due to this operation, the current IW flows from the power converter W-phase via the neutral point, and a negative-side clamp diode into the negative-side DC capacitor to charge the negative-side DC capacitor with the current IW.

As a result, in the mode 2, the absolute value of the current IU that charges the negative-side DC capacitor is larger than the absolute value of the current IV that charges the positive-side DC capacitor. Accordingly, the negative-side DC capacitor voltage is higher than the positive-side DC capacitor voltage, which becomes a factor of causing voltage imbalance.

Assuming that three-phase currents IU, IV, and IW are balanced as a precondition, each time the polarity of the third largest current changes, the positive-side DC capacitor and the negative-side DC capacitor are repeatedly overcharged and insufficiently charged alternately, and thus it is conceivable that there is a lower risk of causing significant voltage imbalance. However, in a case where an accident has occurred in a system that is required to run continuously even when an overcurrent is generated, the three-phase currents IU, IV, and IW significantly deviate from the precondition described above. Therefore, a method to maintain voltage balance is necessary.

As a solution to this necessity, a circuit configuration disclosed in Patent Literature 2 is used. That is, a positive-side DC capacitor and a negative-side DC capacitor are respectively connected to the DC-side of two units of two-level converters, and the AC-side thereof is connected to two sets of AC terminals insulated by an excitation voltage transformer. In this manner, the two units of two-level converters are configured to control their respective DC voltages independently from each other, and in addition to that, these two-level converters also control the positive-side and negative-side DC capacitors so as to maintain balance between the values of these DC capacitors.

The expected objectives can be attained by the device configuration and the control method described above.

Advantageous Effects of Invention

The secondary magnetic excitation generator-motor device of the present invention can achieve contribution to stable management of a power system by improving the operational continuity capability while minimizing torque fluctuations in the generator-motor particularly when a voltage decrease has occurred due to a ground fault or the like caused by lightning striking the power system, and simultaneously by promptly resuming the reactive-power supply capability.

DESCRIPTION OF EMBODIMENTS

Embodiments of a secondary magnetic excitation generator-motor device according to the present invention will be described in detail below with reference to the accompanying drawings. The present invention is not limited to the embodiments.

First Embodiment

Figure 1:
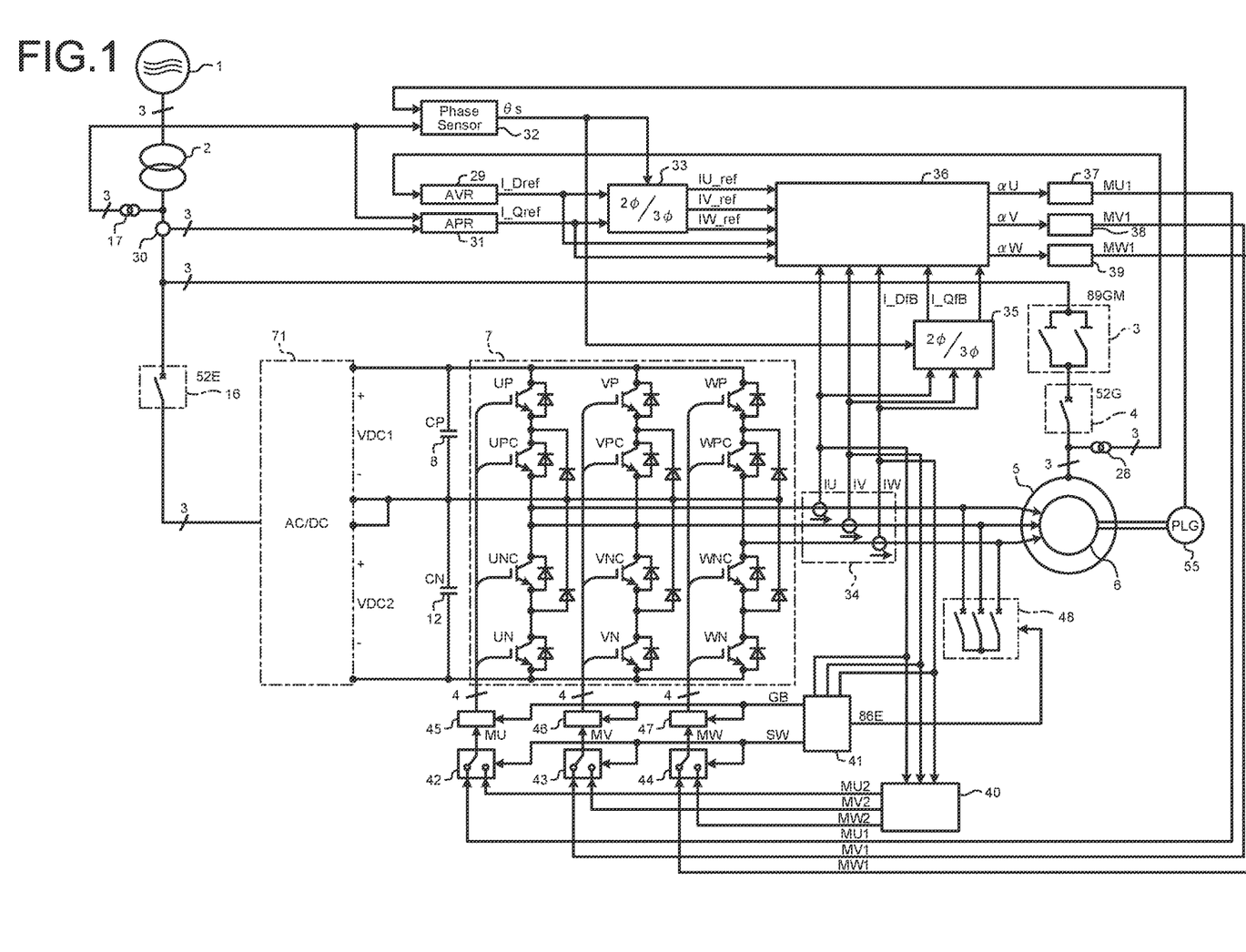
FIG. 1 is a circuit diagram illustrating an embodiment of the present invention.

With reference to FIG. 1, a device configuration according to a first embodiment of the present invention is described below.

A three-phase AC system 1 is connected to a stator-side armature winding 5 of a winding induction machine through a main voltage transformer 2, a phase reverse disconnector (89GM) 3, and a synchronous circuit breaker (52G) 4. A rotor-side excitation winding 6 is connected to an AC-side of a three-level NPC power converter 7. Between a DC-side positive terminal and a neutral point terminal of the three-level NPC power converter 7, a positive-side DC capacitor (CP) 8 and a first DC output terminal (VDC1) of a DC voltage source 71 are connected in parallel to each other.

In contrast, between a DC-side negative terminal and the neutral point terminal of the three-level NPC power converter 7, a negative-side DC capacitor (CN) 12 and a second DC output terminal (VDC2) of the DC voltage source 71 are connected in parallel to each other.

An AC terminal of the DC voltage source 71 is connected in parallel to a first terminal of an excitation circuit breaker (52E) 16, while a second terminal of the excitation circuit breaker (52E) 16 is connected in parallel to a terminal of the main transformer 2 on the winding generator motor-side.

The DC voltage source 71 is constituted by an AC/DC power converter. For example, the DC voltage source 71 can be implemented by having a configuration in which the DC voltage source 71 is connected back to back to the DC-side positive terminal, the DC-side negative terminal, and the neutral point terminal of the three-level NPC power converter 7.

Next, a configuration of the control system of the three-level NPC power converter 7 is described.

An automatic voltage regulator (AVR) 29 is provided to output a d-axis current command (I_Dref) such that the value of generator voltage VG becomes a set value. The value of generator voltage VG is computed on the basis of information from an instrument voltage transformer 28 at a stator-side armature terminal of the winding induction machine. An automatic voltage regulator (APR) 31 is provided to output a q-axis current command (I_Qref) such that the value of active power becomes a set value. The value of active power is computed on the basis of information from an instrument voltage transformer 3 and a main voltage-transformer terminal instrument current transformer 30.

A phase sensor 32 is provided to sense a phase θs of slip frequency which is equal to the difference between an AC-system frequency and a rotational frequency of the winding induction machine on the basis of information from a rotational phase sensor (PLG) 55 and a main voltage-transformer terminal instrument voltage transformer 17, so as to input two-phase current commands (I_Dref and I_Qref) to a two-phase/three-phase coordinates converter 33, from which three-phase current commands (IU_ref, IV_ref, and IW_ref) with the slip frequency are output.

An excitation-current instrument current transformer 34 is provided between the three-level NPC power converter 7 and the terminals of the rotor-side excitation winding 6 of the winding induction machine to detect excitation current values (IU, IV, and IW), such that a three-phase/two-phase converter 35 computes two-phase current values (I_DfB and I_QfB) that are a steady-state DC amount.

An excitation current regulator 36 outputs modulation factor commands (αU, αV, and αW) such that the two-phase current values (I_DfB and I_QfB) correspond with the two-phase current commands (I_Dref and I_Qref), and such that the excitation current values (IU, IV, and IW) correspond with the three-phase current commands (IU_ref, IV_ref, and IW_ref). These modulation factor commands (αU, αV, and αW) are input respectively to three units of PWM modulation circuits 37, 38, and 39 provided for respective phases, from which first modulation commands (MU1, MV1, and MW1) for respective phases are output.

Meanwhile, the excitation current values (IU, IV, and IW) are input from the excitation-current instrument current transformer 34 to a second PWM modulation circuit 40, from which second modulation commands (MU2, MV2, and MW2) are output.

The excitation current values (IU, IV, and IW) are input from the excitation-current instrument current transformer 34 to a running-mode switching circuit 41. The running-mode switching circuit 41 outputs a command value SW for simultaneously switching between the first modulation commands (MU1, MV1, and MW1) and the second modulation commands (MU2, MV2, and MW2). The running-mode switching circuit 41 also outputs a GB command for fixing ignition commands for all the self-arc-extinguishing elements to the off-side.

In such a manner that when the command value SW is 0, the first modulation commands (MU1, MV1, and MW1) are selected, and when the command value SW is 1, the second modulation commands (MU2, MV2, and MW2) are selected, three units of switches 42, 43, and 44 for respective phases selectively output modulation commands (MU, MV, and MW).

The modulation commands (MU, MV, and MW) are input to three units of pulse generation circuits 45, 46, and 47 for respective phases to execute on/off control on gate commands for the self-arc-extinguishing elements of the three-level NPC power converter 7.

Figure 3:
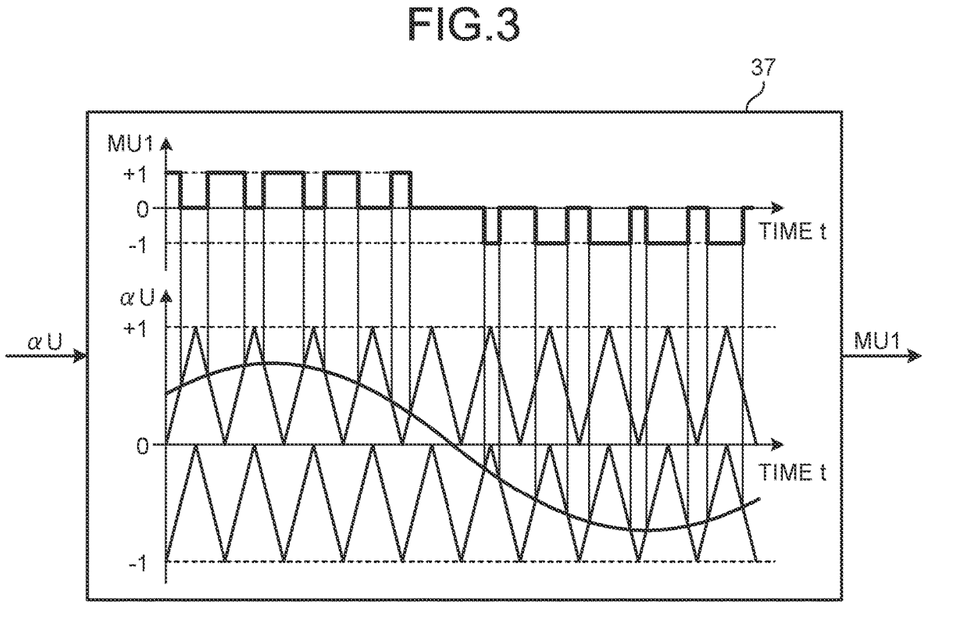
FIG. 3 is a diagram illustrating an operation of a PWM modulation circuit 37 of a three-level NPC power converter.

With reference to FIG. 3, an operation of a U-phase PWM modulation circuit 37 is described below.

The PWM regulation modulation circuit 37 has a positive carrier between the neutral point (0) and the positive terminal (+1), and a negative carrier between the negative terminal (−1) and the neutral point (0). On the basis of the magnitude relation between these carriers and a modulation wave computed from an input-side modulation factor command αU, the PWM regulation circuit 37 outputs the modulation command MU1 that is selected from among three values (+1, 0, and −1).

A V-phase PWM modulation circuit 38 and a W-phase PWM modulation circuit 39 operate in the same manner as the U-phase PWM modulation circuit 37, and therefore descriptions of the operation thereof are omitted to avoid redundant explanations.

Figure 4:
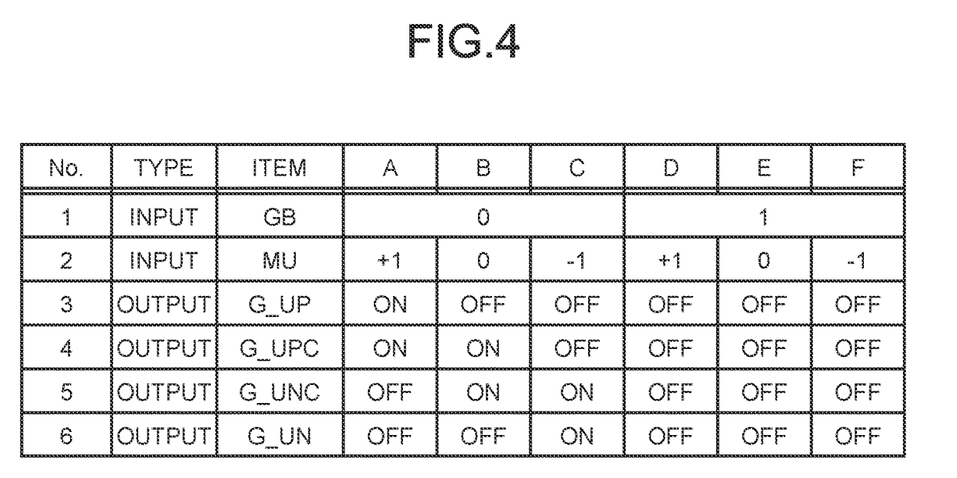
FIG. 4 is a diagram illustrating an operation of a pulse generation circuit 45 of the three-level NPC power converter.

FIG. 4 illustrates an operation of the pulse generation circuit 45 in form of a table.

First, descriptions are made on an operation of the pulse generation circuit 45 when a GB command issued from the running-mode switching circuit 41 shows level 0.

When the modulation command MU is (+1), gate commands G_UP and G_UPC for self-arc-extinguishing elements UP and UPC are on, while the other gate commands are off. When the modulation command MU is (0), the gate command G_UPC for the self-arc-extinguishing element UPC and a gate command G_UNC for a self-arc-extinguishing element UNC are on, while the other gate commands are off. When the modulation command MU is (−1), a gate command G_UN for a self-arc-extinguishing element UN and the gate command G_UNC for the self-arc-extinguishing element UNC are on, while the other gate commands are off. In contrast, when the GB command shows level 1, the gate commands G_UP, G_UPC, G_UNC, and G_UN for the self-arc-extinguishing elements UP, UPC, UNC, and UN are off regardless of the value of the modulation command MU.

Figure 5:
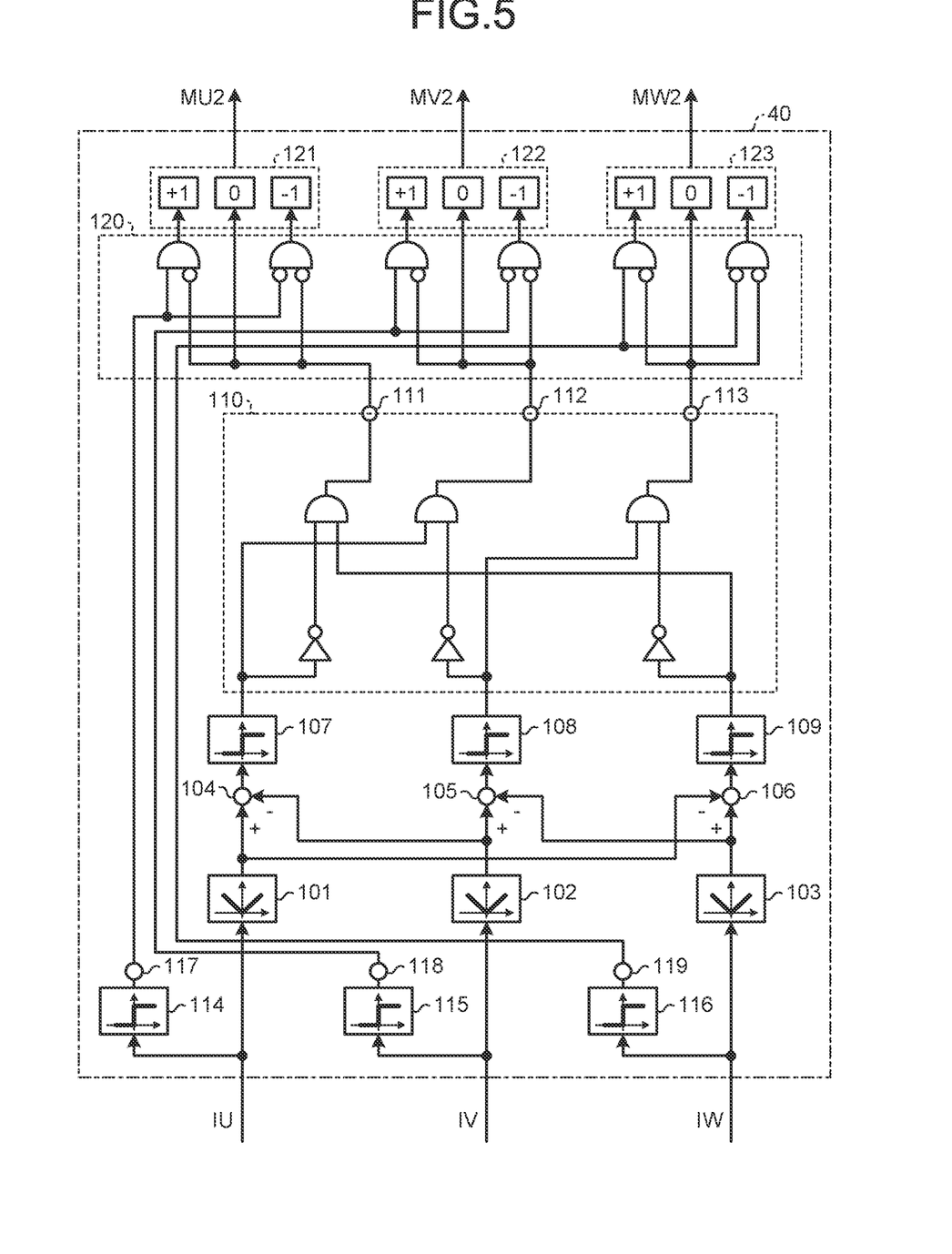
FIG. 5 is a configuration diagram of a second PWM modulation circuit 40 of the three-level NPC power converter.

FIG. 5 illustrates a configuration of the second PWM modulation circuit 40.

Absolute value computation devices 101, 102, and 103 calculate absolute values |IU|, |IV|, and |IW| of the excitation current values (IU, IV, and IW) input from the instrument current transformer 34, respectively. Then, subtractors 104, 105, and 106 output a difference between the absolute values, and comparators 107, 108, and 109 output a sign determination result selectively from two values (0 and 1). The outputs from the comparators 107, 108, and 109 are input to a logic circuit 110. The logic circuit 110 outputs a signal 111 that shows level 1 when the absolute value |IU| is smallest, or otherwise outputs the signal 111 that shows level 0. In the same manner as |IU|, the logic circuit 110 also outputs a signal 112 for |IV| and a signal 113 for |IW|.

Meanwhile, comparators 114, 115, and 116 output the polarity of the excitation current values (IU, IV, and IW) selectively from two values (0 and 1). The comparator 114 outputs a signal 117 that shows level 1 when the excitation current value IU is positive, or otherwise outputs the signal 117 that shows level 0. In the same manner as IU, the comparators 115 and 116 also output a signal 118 for IV and a signal 119 for IW, respectively.

The signals 111, 112, 113, 117, 118, and 119 are input to a logic circuit 120. The logic circuit 120 outputs three values (+1, 0, and −1) for respective phases to three-value selection output circuits 121, 122, and 123.

A U-phase three-value selection output circuit 121 outputs "0" as the second modulation output MU2 when the absolute value of IU is smallest in three phases, outputs "+1" as the second modulation output MU2 when IU is positive, and outputs "−1" as the second modulation output MU2 when IU is negative. A V-phase three-value selection output circuit 122 and a W-phase three-value selection output circuit 123 operate in the same manner as the U-phase three-value selection output circuit 121, and therefore descriptions of the operation thereof are omitted to avoid redundant explanations.

Figure 6:
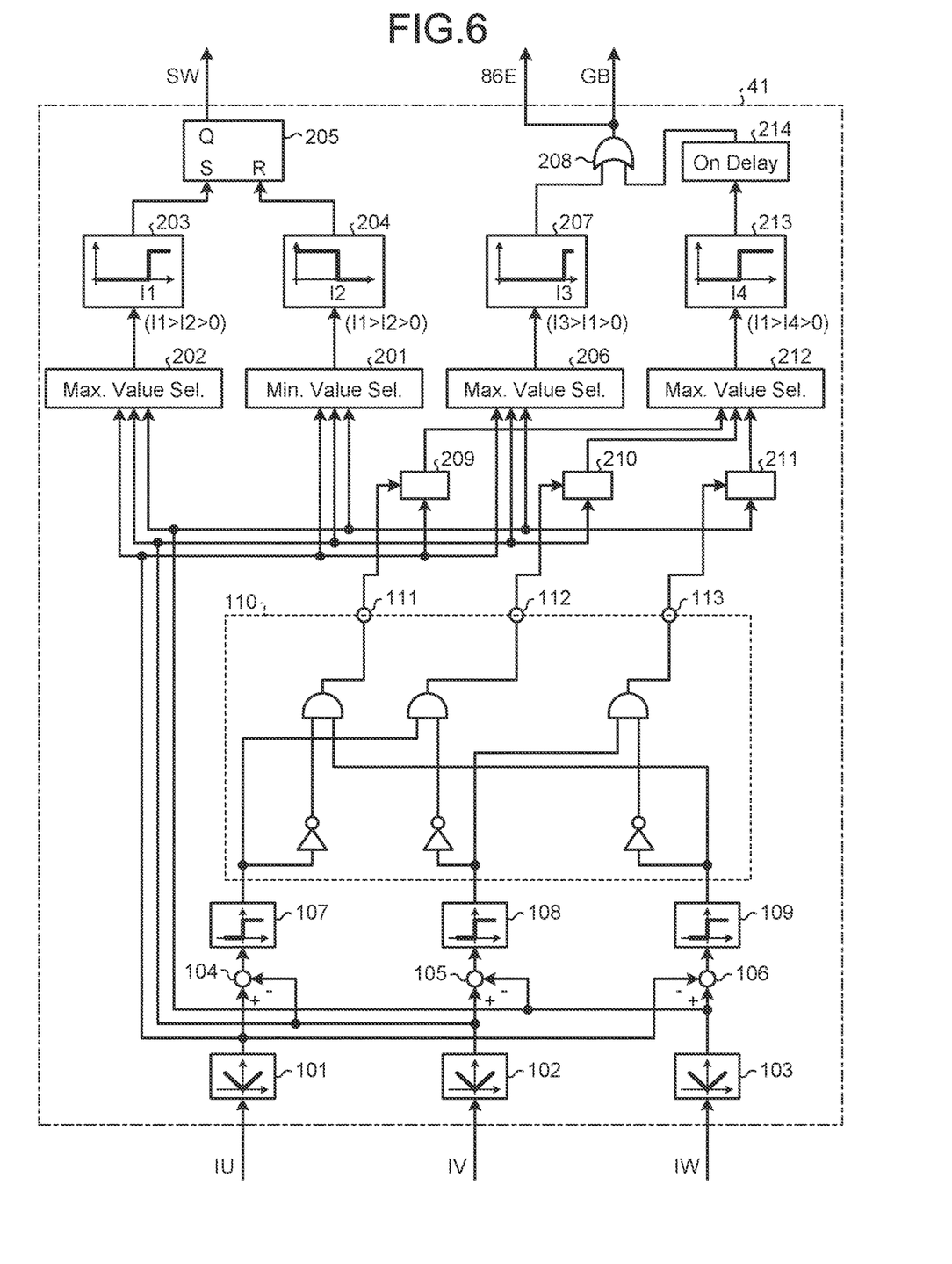
FIG. 6 is a configuration diagram of a running-mode switching circuit 41 of the three-level NPC power converter.

FIG. 6 illustrates a configuration of the running-mode switching circuit 41. Since like reference signs to those illustrated in FIG. 5 denote like constituent elements, descriptions thereof are omitted to avoid redundant explanations.

A maximum-value selection output device 202 selectively outputs the maximum value of the absolute values |IU|, |IV|, and |IW| of the excitation current values (IU, IV, and IW) input from the instrument current transformer 34. A minimum-value selection output device 201 selectively outputs the minimum value of the absolute values |IU|, |IV|, and |IW|. When the maximum value exceeds a set value I1, a comparator 203 outputs level 1, or otherwise outputs level 0. When the minimum value is equal to or smaller than a set value I2, a comparator 204 outputs level 1, or otherwise outputs level 0. A flip-flop 205 receives a set signal output from the comparator 203, and a reset signal output from the comparator 204, and on the basis of these signals, outputs a command value SW.

When the command value SW shows level 0, the switches 42, 43, and 44 select the first modulation commands (MU1, MV1, and MW1). When the command value SW shows level 1, the switches 42, 43, and 44 select the second modulation commands (MU2, MV2, and MW2).

The set values I1 and I2 are defined as "I1>I2". The value of I1 is set with reference to the maximum interrupting current of the self-arc-extinguishing elements of the three-level NPC power converter 7 to such a value as not to exceed the maximum interrupting current.

Figure 7:
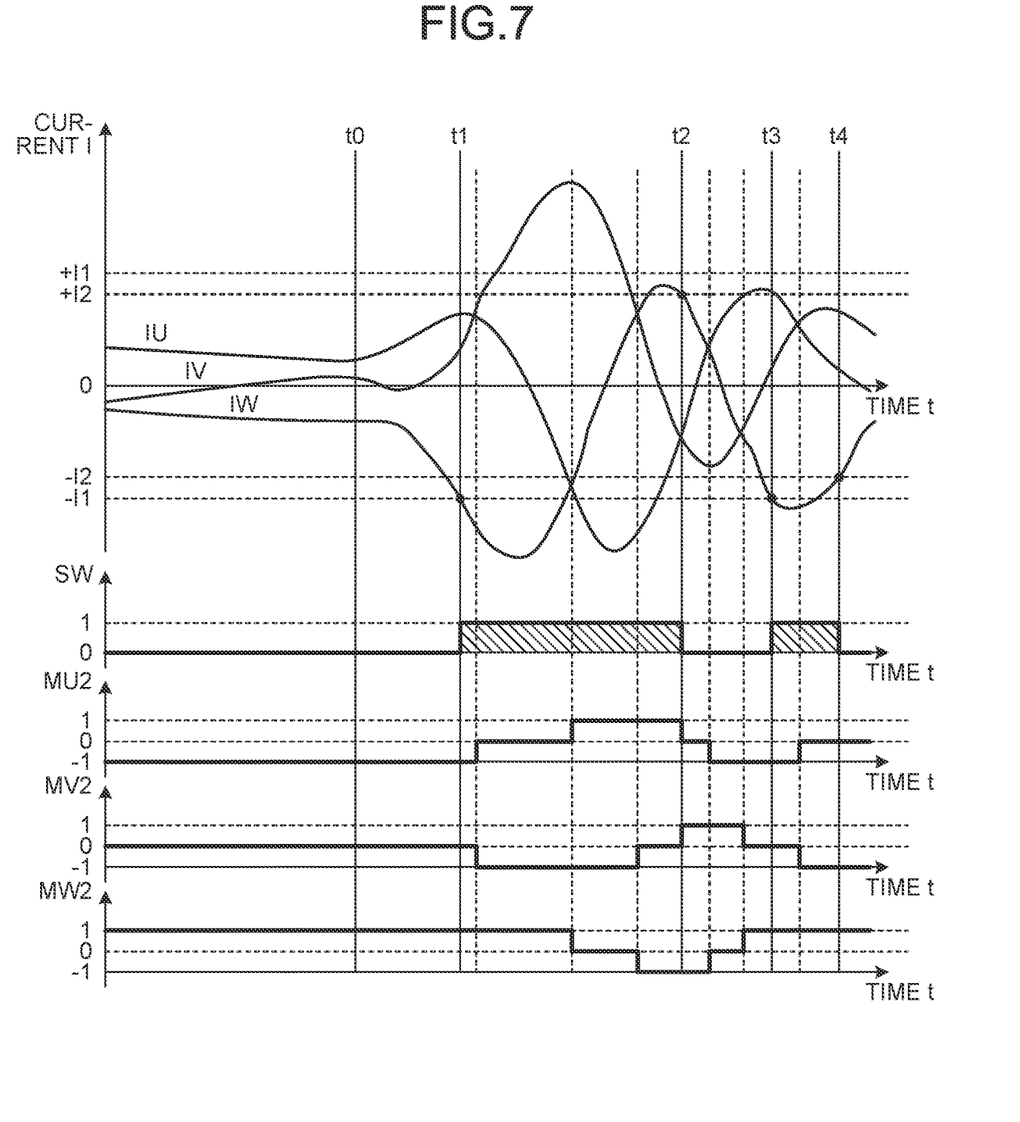
FIG. 7 is a diagram illustrating an operation of the present invention.
Figure 8:
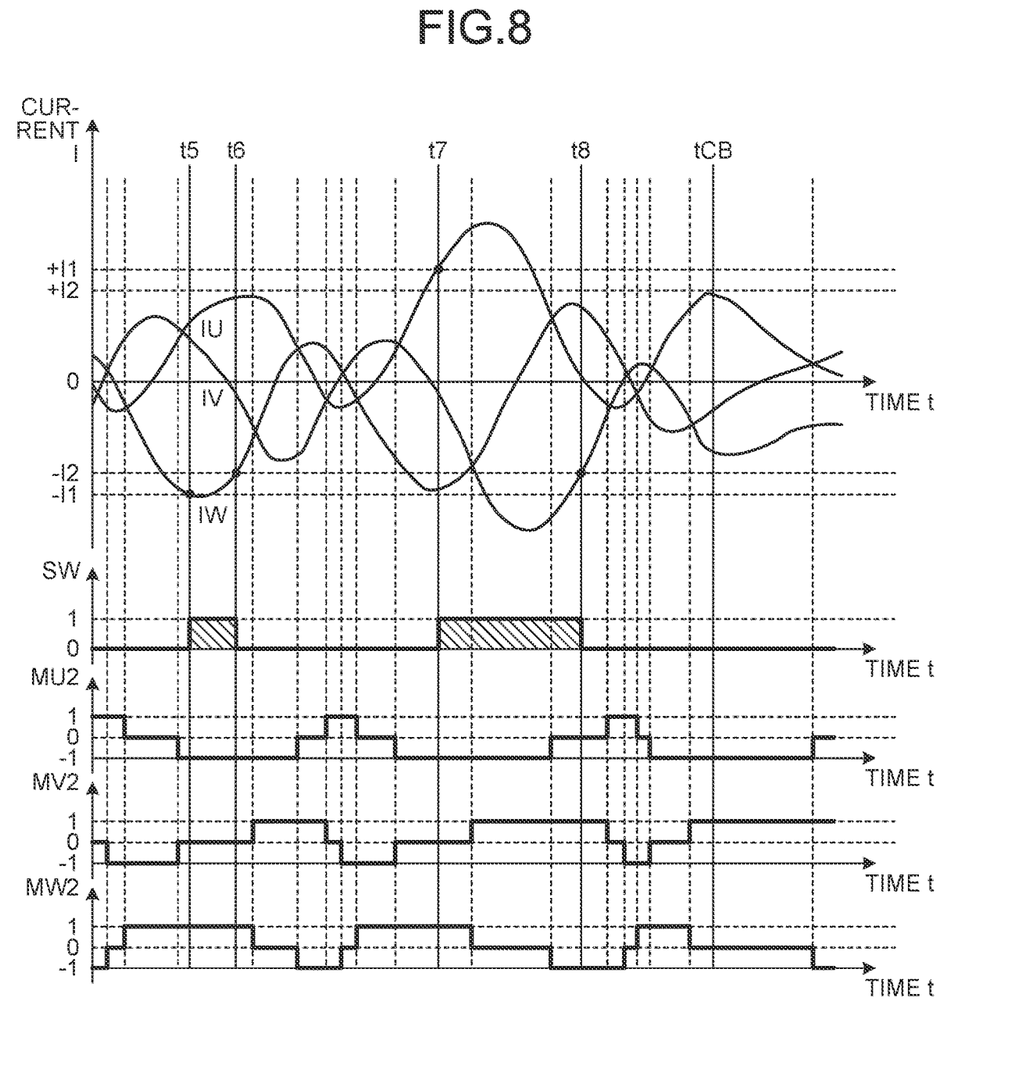
FIG. 8 is a diagram illustrating an operation of the present invention.

FIGS. 7 and 8 illustrate an operation of the secondary magnetic excitation generator-motor device in FIGS. 1 to 6 when a ground fault has occurred in the three-phase AC system 1 at a time t0, and then the accidental phase is removed to resume a normal operation at a time tCB.

During a period (from t1 to t2) and a period (from t3 to t4) in FIG. 7, and during a period (from t5 to t6) and a period (from t7 to t8) in FIG. 8, the command value SW shows level 1. Thus, the second modulation commands (MU2, MV2, and MW2) are selected.

According to the configuration of the invention described in the present embodiment, the secondary magnetic excitation generator-motor device can be protected from an overcurrent without the need for bypassing the three-level NPC power converter 7 and without the need for blocking the gates. Therefore, the secondary magnetic excitation generator-motor device can precisely switch between two different modulation commands, and consequently can be protected from an overcurrent and can run continuously in a stable manner.

Second Embodiment

Figure 2:
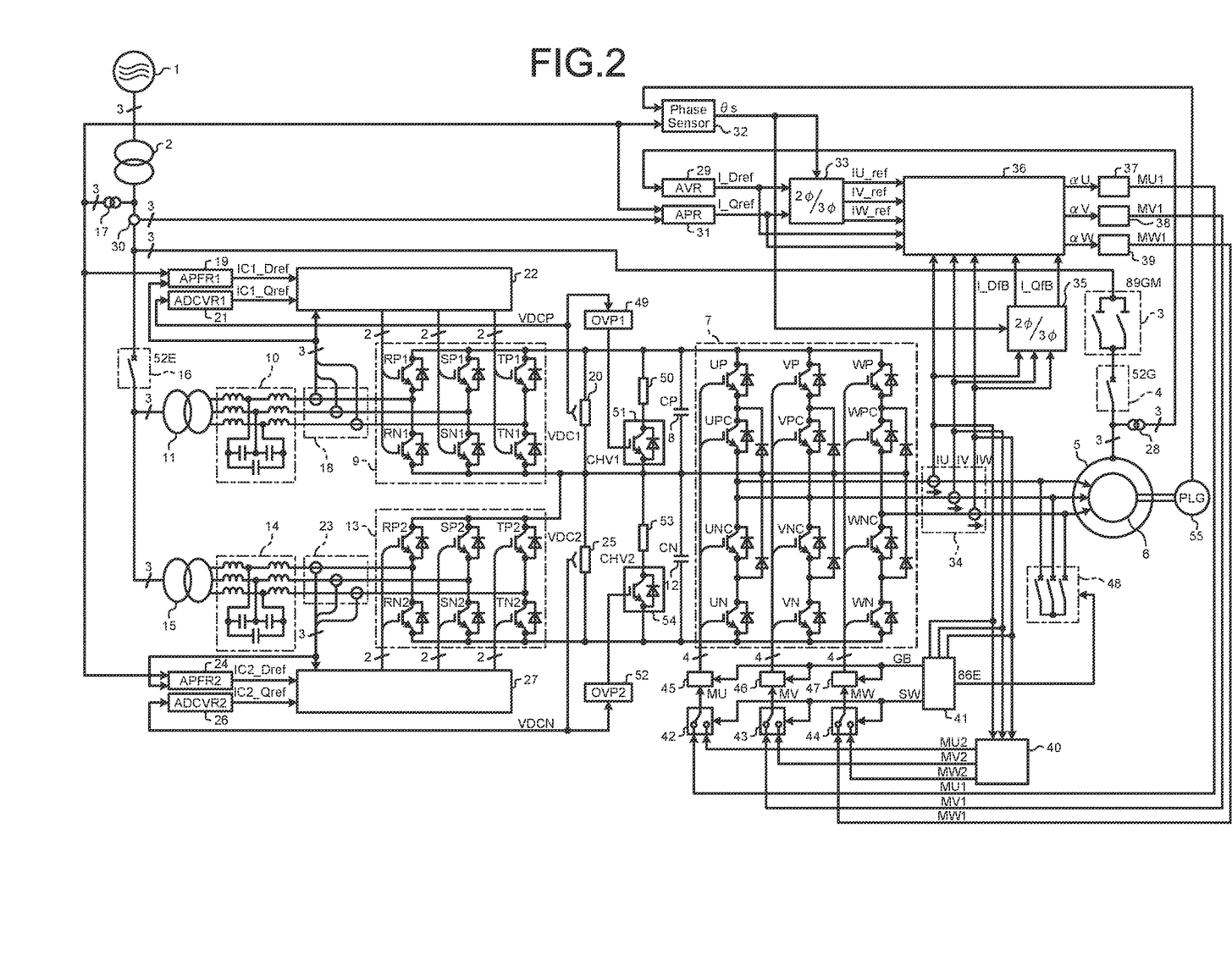
FIG. 2 is a circuit diagram illustrating another embodiment of the present invention.

With reference to FIG. 2, a device configuration according to a second embodiment of the present invention is described below.

Between a DC-side positive terminal and the neutral point terminal of the three-level NPC power converter 7, the positive-side DC capacitor (CP) 8 and a DC terminal of a first two-level power converter 9 are connected in parallel to each other. An AC terminal of the first two-level power converter 9 is connected to a first excitation voltage transformer 11 through a first harmonic suppression filter 10.

In contrast, between the neutral point terminal and a DC-side negative terminal of the three-level NPC power converter 7, the negative-side DC capacitor (CN) 12 and a DC terminal of a second two-level power converter 13 are connected in parallel to each other. An AC terminal of the second two-level power converter 13 is connected to a second excitation voltage transformer 15 through a second harmonic suppression filter 14.

The first excitation voltage transformer 11 and a terminal of the second excitation voltage transformer 15 on the AC system-side is connected in parallel to a first terminal of the excitation circuit breaker (52E) 16. A second terminal of the excitation circuit breaker (52E) 16 is connected in parallel to the terminal of the main voltage transformer 2 on the winding generator motor-side.

Next, a configuration and an operation of the control system of the first two-level power converter 9 is described.

A first power factor regulator (APFR1) 19 is provided to output a d-axis DC current command (IC1_Dref) such that the power factor becomes 1 on the basis of reactive power computed from information provided by the main voltage-transformer terminal instrument voltage transformer 17 provided at the terminal of the main voltage transformer 2 on the winding generator motor-side, and provided by a first instrument current transformer 18 provided between the first harmonic suppression filter 10 and the AC terminal. A first DC-voltage regulator (ADCVR1) 21 is provided to output a q-axis DC current command (IC1_Qref) such that a first instrument DC voltage transformer 20 detects a voltage VDCP in the positive-side DC capacitor 8 to regulate the voltage VDCP to a set value. A first two-level converter current regulator 22 executes on/off control on the gates to self-arc-extinguishing elements (RP1, SP1, TP1, RN1, SN1, and TN1) forming the first two-level converter 9.

Similarly to the first two-level power converter 9, a configuration of the control system of the second two-level power converter 13 is described below.

A second power factor regulator (APFR2) 24 is provided to output a d-axis DC current command (IC2_Dref) such that the power factor becomes 1 on the basis of reactive power computed from information provided by the main voltage-transformer terminal instrument voltage transformer 17, and by a second instrument current transformer 23 provided between the second harmonic suppression filter 14 and the AC terminal. A second DC-voltage regulator (ADCVR2) 26 is provided to output a q-axis DC current command (IC2_Qref) such that a second instrument DC voltage transformer 25 detects a voltage VDCN in the negative-side DC capacitor 12 to regulate the voltage VDCN to a set value. A second two-level converter current regulator 27 executes on/off control on the gates to self-arc-extinguishing elements (RP2, SP2, TP2, RN2, SN2, and TN2) forming the second two-level converter 13.

According to the configuration of the first and second two-level power converters described above, two units of two-level converters (the first two-level converter 9 and the second two-level converter 13) connected to the AC power supply and insulated from each other by two units of excitation voltage transformers (the first excitation voltage transformer 11 and the second excitation voltage transformer 15) control the positive DC capacitor voltage VDCP and the negative DC capacitor voltage VDCN independently from each other. Therefore, even during a transition period such as at the occurrence of an accident in the system, balance between the voltages of two units of DC capacitors can still be maintained in a stable manner.

According to the configuration of the invention described in the present embodiment, the two units of two-level converters can control their respective DC voltages independently from each other, and therefore can control the positive-side and negative-side DC capacitors so as to maintain balance between the values of these DC capacitors.

Third Embodiment

With reference to FIG. 2, a device configuration according to a third embodiment of the present invention is described below.

A bypass circuit 48 is provided between the excitation-current instrument current transformer 34 and the terminals of the rotor-side excitation winding 6 of the winding induction machine. It is allowable that the bypass circuit 48 is formed of power semiconductor elements. However, as illustrated in the present embodiment, it is also allowable to use a vacuum circuit breaker having achieved a remarkable technological progress, such as ensuring that the vacuum circuit breaker can properly operate 150k times. This bypass circuit is closed in accordance with an 86E command issued from the running-mode switching circuit 41. In accordance with a GB command, the pulse generation circuits 45, 46, and 47 block the gates of the self-arc-extinguishing elements of the three-level NPC power converter 7 to stop the operation.

FIG. 6 illustrates a circuit to output an operation command (86E command) for the bypass circuit 48.

A maximum-value selection circuit 206 selectively outputs the maximum value of the absolute values |IU|, |IV|, and |IW| of the excitation current values (IU, IV, and IW). When the maximum value exceeds a set value I3, a comparator 207 outputs a signal of level 1, or otherwise outputs a signal of level 0. The comparator 207 outputs a GB command and an 86E command via an OR circuit 208.

The set value I3 is set larger than the set value I1 (I3>I1). The reason for this is that while the value of overcurrent generated due to a ground fault or the like in the three-phase AC system 1 is reduced by impedance of the main voltage transformer 2, the value of overcurrent generated at an occurrence of a fault in the winding induction machine of the main voltage transformer 2 is not reduced. The set value I3 is set with reference to the maximum current generated due to a ground fault in the three-phase AC system 1. Due to this setting, a fault in the device is distinguished from a fault in the three-phase AC system, so that when a fault has occurred in the device, the device can stop running immediately to be protected from the fault.

Fourth Embodiment

With reference to FIG. 6, a device configuration and a circuit according to a fourth embodiment of the present invention is described below.

Operations of output switches 209, 210, and 211 are described below. Hereinafter, an operation of a U-phase output switch 209 is described. A V-phase output switch 210 and a W-phase output switch 211 operate in the same manner as the U-phase output switch 209, and therefore descriptions of the operations thereof are omitted to avoid redundant explanations.

When |IU| is smallest, the signal 111 shows level 1 or otherwise shows level 0. The output switch 209 outputs |IU| that is an absolute value of the third-phase current when the signal 111 shows level 1, while outputting "0" when the signal 111 shows level 0.

A maximum-value selection circuit 212 selectively outputs the maximum value of the absolute values |IU|, |IV|, and |IW| of the respective phase currents. When the maximum value selectively output by the maximum-value selection circuit 212 exceeds a set value I4, a comparator 213 outputs a signal of level 1, or otherwise outputs a signal of level 0. An on-delay circuit 214 outputs a signal of level 1 when the absolute value of the third-phase current is maintained for a set time or longer, and outputs a GB command and an 86E command via the OR circuit 208.

The set value I4 is set smaller than the set value I1 (I4<I1). The reason for this is that the third-phase current flows via any of the self-arc-extinguishing elements (UPC, UNC, VPC, VNC, WPC, and WNC). In general, since a self-arc-extinguishing element has a higher conduction loss than that in a diode connected in inverse parallel, the self-arc-extinguishing element has a lower overcurrent withstand capability. Due to this setting, time-limited overcurrent protection for the third phase enables the device to be safely protected from overcurrent.

Fifth Embodiment

With reference to FIG. 2, a device configuration according to a fifth embodiment of the present invention is described below.

When the positive-side DC capacitor voltage VDCP from the first instrument DC voltage transformer 20 exceeds a set value, a first overvoltage suppressor (OVP1) 49 executes on/off control on a switch circuit (CHV1) 51 formed of a self-arc-extinguishing element connected in series to a limiting resistance 50 such that the limiting resistance 50 consumes power so as to suppress an increase in the positive-side DC capacitor voltage VDCP.

Similarly, when the negative-side DC capacitor voltage VDCN from the second instrument DC voltage transformer 25 exceeds a set value, a second overvoltage suppressor (OVP2) 52 executes on/off control on a switch circuit (CHV2) 54 formed of a self-arc-extinguishing element connected in series to a limiting resistance 53 such that the limiting resistance 53 consumes power so as to suppress an increase in the negative-side DC capacitor voltage VDCN.

According to the configuration of the present invention, even when the second modulation commands (MU2, MV2, and MW2) are selected, the charging operation is still ensured for both the positive-side DC capacitor (CP) 8 and the negative-side DC capacitor (CN) 12. This eliminates the need for a solution to a decrease in the DC voltage. Accordingly, it is only necessary to include a unit to suppress an increase in the DC voltage. Due to this configuration in which only a simple voltage suppression circuit is added, even at an occurrence of an accident in the system, the secondary magnetic excitation generator-motor device can still run continuously in a stable manner.

However, in a case with the three-level NPC power converter, during a period for which the second modulation commands (MU2, MV2, and MW2) are selected, charging/discharging with the third-phase current becomes a factor of causing imbalance between the positive-side DC capacitor (CP) 8 and the negative-side DC capacitor (CN) 12. However, the configuration of the present invention can reduce the positive-side DC voltage and the negative-side DC voltage independently from each other, so that the secondary magnetic excitation generator-motor device can achieve continuous and stable running even at an occurrence of an accident in the system.

REFERENCE SIGNS LIST 1 three-phase AC system
2 main voltage transformer
3 phase reverse disconnector (89GM)
4 synchronous circuit breaker (52G)
5 stator-side armature winding
6 rotor-side excitation winding
7 three-level NPC power converter
8 positive-side DC capacitor (CP)
9 first two-level power converter
10 first harmonic suppression filter
11 first excitation voltage transformer
12 negative-side DC capacitor (CN)
13 second two-level power converter
14 second harmonic suppression filter
15 second excitation voltage transformer
16 excitation circuit breaker (52E)
17 main voltage-transformer terminal instrument voltage transformer
18 first instrument current transformer
19 first power factor regulator (APFR1)
20 first instrument DC voltage transformer
21 first DC-voltage regulator (ADCVR1)
22 first two-level converter current regulator
23 second instrument current transformer
24 second power factor regulator (APFR2)
25 second instrument DC voltage transformer
26 second DC-voltage regulator (ADCVR2)
27 second two-level converter current regulator
28 instrument voltage transformer
29 automatic voltage regulator (AVR)
30 main voltage-transformer terminal instrument current transformer
31 automatic voltage regulator (APR)
32 phase sensor
33 two-phase/three-phase coordinates converter
34 excitation-current instrument current transformer
35 three-phase/two-phase converter
36 excitation current regulator
37, 38, 39 PWM modulation circuit
40 second PWM modulation circuit
41 running-mode switching circuit
42, 43, 44 switch
45, 46, 47 pulse generation circuit
48 bypass circuit
49 first overvoltage suppressor
50, 53 limiting resistance
51 switch circuit (CHV1)
52 second overvoltage suppressor
54 switch circuit (CHV2)
55 rotational phase sensor (PLG)
71 DC voltage source
101, 102, 103 absolute value computation device
104, 105, 106 subtractor
107, 108, 109, 114, 115, 116 comparator
110, 120 logic circuit
111, 112, 113, 117, 118, 119 signal
121, 122, 123 three-value selection output circuit
201, 206, 212 maximum-value selection output device
202 minimum-value selection output device
203, 204 comparator
205 flip-flop
208 OR circuit
209, 210, 211 output switch
214 on-delay circuit

The invention claimed is:

1. A secondary magnetic excitation generator-motor device comprising:
a winding induction machine with a stator-side armature winding being connected to an AC system;
a three-level NPC power converter to which a rotor-side excitation winding of the winding induction machine is connected;
a first DC capacitor connected between a positive DC terminal and a neutral point of the three-level NPC power converter;
a second DC capacitor connected between the neutral point and a negative DC terminal of the three-level NPC power converter;
a DC voltage source to supply a DC voltage to the first DC capacitor and the second DC capacitor;
an excitation current detector to detect an excitation winding current of the winding induction machine; and
an excitation current command device to compute an excitation current command value with a slip frequency equal to a difference between a frequency of the AC system and a rotational frequency of the winding induction machine, and to output a first ignition pulse command such that a detected excitation current value from the excitation current detector corresponds with the excitation current command value,
wherein the secondary magnetic excitation generator-motor device is configured to input the first ignition pulse command to a self-arc-extinguishing semiconductor element of the three-level NPC power converter,
wherein the secondary magnetic excitation generator-motor device has a function of identifying a first phase, a second phase, or a third phase in descending order of a current absolute value from the excitation current detector,
wherein the secondary magnetic excitation generator-motor device further comprises a pulse command device configured to:
separate four series-connected self-arc-extinguishing semiconductor elements formed of a self-arc-extinguishing semiconductor element P1C between the first phase and a positive-side clamp diode, a self-arc-extinguishing semiconductor element P1 between the self-arc-extinguishing semiconductor element P1C and a positive electrode, a self-arc-extinguishing semiconductor element N1C between the first phase and a negative-side clamp diode, and a self-arc-extinguishing semiconductor element N1 between the self-arc-extinguishing semiconductor element N1C and a negative electrode into a first-phase P group formed of the self-arc-extinguishing semiconductor element P1 and the self-arc-extinguishing semiconductor element P1C, and a first-phase N group formed of the self-arc-extinguishing semiconductor element N1 and the self-arc-extinguishing semiconductor element N1C;

determine a polarity of a detected current value for the first phase;

fix an ignition pulse in either the first-phase P group or the first-phase N group to an on-side, while fixing an ignition pulse in the other group to an off-side in a direction in which the first and second DC capacitors are charged;

separate four series-connected self-arc-extinguishing semiconductor elements formed of a self-arc-extinguishing semiconductor element P2C between the second phase and a positive-side clamp diode, a self-arc-extinguishing semiconductor element P2 between the self-arc-extinguishing semiconductor element P2C and a positive electrode, a self-arc-extinguishing semiconductor element N2C between the second phase and a negative-side clamp diode, and a self-arc-extinguishing semiconductor element N2 between the self-arc-extinguishing semiconductor element N2C and a negative electrode into a second-phase P group formed of the self-arc-extinguishing semiconductor element P2 and the self-arc-extinguishing semiconductor element P2C, and a second-phase N group formed of the self-arc-extinguishing semiconductor element N2 and the self-arc-extinguishing semiconductor element N2C;

fix an ignition pulse in the second-phase P group to a same side as the first-phase N group, while fixing an ignition pulse in the second-phase N group to a same side as the first-phase P group;

to separate four series-connected self-arc-extinguishing semiconductor elements formed of a self-arc-extinguishing semiconductor element P3C between the third phase and a positive-side clamp diode, a self-arc-extinguishing semiconductor element P3 between the self-arc-extinguishing semiconductor element P3C and a positive electrode, a self-arc-extinguishing semiconductor element N3C between the third phase and a negative-side clamp diode, and a self-arc-extinguishing semiconductor element N3 between the self-arc-extinguishing semiconductor element N3C and a negative electrode into a third-phase first group formed of the self-arc-extinguishing semiconductor element P3C and the self-arc-extinguishing semiconductor element N3C, and a third-phase second group formed of the self-arc-extinguishing semiconductor element P3 and the self-arc-extinguishing semiconductor element N3;

fix an ignition pulse in the third-phase first group to on, while fixing an ignition pulse in the third-phase second group to off;

output the ignition pulses as a second ignition pulse command, and wherein a pulse switch is provided to switch between the first ignition pulse command and the second ignition pulse command bidirectionally to be output to the three-level NPC power converter, so that on conditions including a condition that any of absolute values of detected current values from the excitation current detector exceeds a set overcurrent level 1, the pulse switch switches from a first ignition pulse command to a second ignition pulse command, and on conditions including a condition that detected current values for three phases from the excitation current detector are all equal to or smaller than a set overcurrent level 2, the pulse switch switches from the second ignition pulse command to the first ignition pulse command.

2. The secondary magnetic excitation generator-motor device according to claim 1, wherein the DC voltage source is constituted by an excitation voltage transformer insulated from the AC system to supply two sets of AC voltages, a first two-level power converter connected at an AC terminal thereof to one of the two sets of AC voltages, and connected at a DC terminal thereof to the first DC capacitor to execute voltage control, and a second two-level power converter connected at an AC terminal thereof to the other of the two sets of AC voltages, and connected at a DC terminal thereof to the second DC capacitor to execute DC voltage control.

3. The secondary magnetic excitation generator-motor device according to claim 1, wherein a current bypass circuit is provided between a rotor-side excitation winding of the winding induction machine and the excitation current detector, and when any of absolute values of detected current values from the excitation current detector exceeds a set overcurrent level 3, the current bypass circuit is closed, and ignition commands for self-arc-extinguishing semiconductor elements of the three-level NPC power converter are all off, where a value of the set overcurrent level 3 is larger than that of the set overcurrent level 1.

4. The secondary magnetic excitation generator-motor device according to claim 1, wherein a current bypass circuit is provided between a rotor-side excitation winding of the winding induction machine and the excitation current detector, and when a current absolute value for the third phase exceeds a set overcurrent level 4, the current bypass circuit is closed, and ignition commands for self-arc-extinguishing semiconductor elements of the three-level NPC power converter are all off, where a value of the set overcurrent level 4 is smaller than that of the set overcurrent level 1.

5. The secondary magnetic excitation generator-motor device according to claim 1, wherein a first DC voltage sensor and a first active DC voltage suppression circuit are connected in parallel to the first DC capacitor, the first active DC voltage suppression circuit connecting a resistance and a first self-arc-extinguishing semiconductor element in series, and a second DC voltage sensor and a second active DC voltage suppression circuit are connected in parallel to the second DC capacitor, the second active DC voltage suppression circuit connecting a resistance and a second self-arc-extinguishing semiconductor element in series, so as to execute on/off control on the first self-arc-extinguishing semiconductor element to reduce a DC voltage when a detection value of the first DC voltage sensor exceeds a set range, and so as to execute on/off control on the second self-arc-extinguishing semiconductor element to reduce a DC voltage when a detection value of the second DC voltage sensor exceeds a set range.

6. The secondary magnetic excitation generator-motor device according to claim 2, wherein a current bypass circuit is provided between a rotor-side excitation winding of the winding induction machine and the excitation current detector, and when any of absolute values of detected current values from the excitation current detector exceeds a set overcurrent current level 3, the current bypass circuit is closed, and ignition commands for self-arc-extinguishing semiconductor elements of the three-level NPC power converter are all off, where a value of the set overcurrent level 3 is larger than that of the set overcurrent level 1.

7. The secondary magnetic excitation generator-motor device according to claim 2, wherein a current bypass circuit is provided between a rotor-side excitation winding of the winding induction machine and the excitation current detector, and when a current absolute value for the third phase exceeds a set overcurrent current level 4, the current bypass circuit is closed, and ignition commands for self-arc-extinguishing semiconductor elements of the three-level NPC power converter are all off, where a value of the set overcurrent level 4 is smaller than that of the set overcurrent level 1.

8. The secondary magnetic excitation generator-motor device according to claim 2, wherein a first DC voltage sensor and a first active DC voltage suppression circuit are connected in parallel to the first DC capacitor, the first active DC voltage suppression circuit connecting a resistance and a first self-arc-extinguishing semiconductor element in series, and a second DC voltage sensor and a second active DC voltage suppression circuit are connected in parallel to the second DC capacitor, the second active DC voltage suppression circuit connecting a resistance and a second self-arc-extinguishing semiconductor element in series, so as to execute on/off control on the first self-arc-extinguishing semiconductor element to reduce a DC voltage when a detection value of the first DC voltage sensor exceeds a set range, and so as to execute on/off control on the second self-arc-extinguishing semiconductor element to reduce a DC voltage when a detection value of the second DC voltage sensor exceeds a set range.

9. The secondary magnetic excitation generator-motor device according to claim 3, wherein a first DC voltage sensor and a first active DC voltage suppression circuit are connected in parallel to the first DC capacitor, the first active DC voltage suppression circuit connecting a resistance and a first self-arc-extinguishing semiconductor element in series, and a second DC voltage sensor and a second active DC voltage suppression circuit are connected in parallel to the second DC capacitor, the second active DC voltage suppression circuit connecting a resistance and a second self-arc-extinguishing semiconductor element in series, so as to execute on/off control on the first self-arc-extinguishing semiconductor element to reduce a DC voltage when a detection value of the first DC voltage sensor exceeds a set range, and so as to execute on/off control on the second self-arc-extinguishing semiconductor element to reduce a DC voltage when a detection value of the second DC voltage sensor exceeds a set range.

10. The secondary magnetic excitation generator-motor device according to claim 4, wherein a first DC voltage sensor and a first active DC voltage suppression circuit are connected in parallel to the first DC capacitor, the first active DC voltage suppression circuit connecting a resistance and a first self-arc-extinguishing semiconductor element in series, and a second DC voltage sensor and a second active DC voltage suppression circuit are connected in parallel to the second DC capacitor, the second active DC voltage suppression circuit connecting a resistance and a second self-arc-extinguishing semiconductor element in series, so as to execute on/off control on the first self-arc-extinguishing semiconductor element to reduce a DC voltage when a detection value of the first DC voltage sensor exceeds a set range, and so as to execute on/off control on the second self-arc-extinguishing semiconductor element to reduce a DC voltage when a detection value of the second DC voltage sensor exceeds a set range.

11. The secondary magnetic excitation generator-motor device according to claim 6, wherein a first DC voltage sensor and a first active DC voltage suppression circuit are connected in parallel to the first DC capacitor, the first active DC voltage suppression circuit connecting a resistance and a first self-arc-extinguishing semiconductor element in series, and a second DC voltage sensor and a second active DC voltage suppression circuit are connected in parallel to the second DC capacitor, the second active DC voltage suppression circuit connecting a resistance and a second self-arc-extinguishing semiconductor element in series, so as to execute on/off control on the first self-arc-extinguishing semiconductor element to reduce a DC voltage when a detection value of the first DC voltage sensor exceeds a set range, and so as to execute on/off control on the second self-arc-extinguishing semiconductor element to reduce a DC voltage when a detection value of the second DC voltage sensor exceeds a set range.

12. The secondary magnetic excitation generator-motor device according to claim 7, wherein a first DC voltage sensor and a first active DC voltage suppression circuit are connected in parallel to the first DC capacitor, the first active DC voltage suppression circuit connecting a resistance and a first self-arc-extinguishing semiconductor element in series, and a second DC voltage sensor and a second active DC voltage suppression circuit are connected in parallel to the second DC capacitor, the second active DC voltage suppression circuit connecting a resistance and a second self-arc-extinguishing semiconductor element in series, so as to execute on/off control on the first self-arc-extinguishing semiconductor element to reduce a DC voltage when a detection value of the first DC voltage sensor exceeds a set range, and so as to execute on/off control on the second self-arc-extinguishing semiconductor element to reduce a DC voltage when a detection value of the second DC voltage sensor exceeds a set range.

\* \* \* \* \*